US007892632B2

(12) United States Patent
Zabetakis et al.

(10) Patent No.: US 7,892,632 B2
(45) Date of Patent: Feb. 22, 2011

(54) METALLIZED FIBERS AND METHOD THEREFOR

(75) Inventors: Daniel Zabetakis, Brandywine, MD (US); Paul E Schoen, Alexandria, VA (US); Michael A. Dinderman, Bowie, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 1292 days.

(21) Appl. No.: 10/956,593

(22) Filed: Sep. 30, 2004

(65) Prior Publication Data

US 2006/0068667 A1 Mar. 30, 2006

(51) Int. Cl.
*B32B 27/12* (2006.01)

(52) U.S. Cl. ..................... 428/220; 428/300.1; 428/379

(58) Field of Classification Search .......... 428/361.379, 428/393, 389, 300.1, 220, 379; 427/324, 427/443.1, 439
See application file for complete search history.

(56) References Cited

U.S. PATENT DOCUMENTS 4,783,279 A * 11/1988 Petermann et al. .......... 252/511
4,960,642 A * 10/1990 Kosuga et al. .............. 428/407
6,214,454 B1 * 4/2001 Kanda et al. ............. 428/294.7
6,726,964 B1 * 4/2004 Thompson et al. .......... 427/600

FOREIGN PATENT DOCUMENTS

| | | | |
|---|---|---|---|
| EP | 1130154 | A2 * | 9/2001 |
| JP | 49027700 | A * | 3/1974 |
| JP | 01138234 | A * | 5/1989 |
| JP | 11354969 | A * | 12/1999 |

* cited by examiner

*Primary Examiner*—Elizabeth M Cole
(74) *Attorney, Agent, or Firm*—Amy L. Ressing; Joseph T. Grunkemeyer

(57) ABSTRACT

This invention pertains to a product and a method for preparing same. The product is an electrically conducting metallized fibers and a non-conducting composite containing the metallized fibers. In a preferred embodiment, the product is a composite of metallized cellulose fibers disposed in an electrically non-conducting matrix. The method includes the steps of hydrating cellulose fibers to prevent absorption of chemical reagents; activating the cellulose surface of the fibers for metal deposition; removing from the fibers excess activator and reagents used in the activation; drying the fibers to a free-flowing condition whereby the fibers acquire the color of the activator by virtue of its deposition on the fibers; metallizing the fibers to deposit thereon a metal capable of absorbing electromagnetic radiation; drying the metallized fibers whereby they are free-flowing; and forming a composite composed of an electrically non-conductive matrix having dispersed therein the matallized fibers.

8 Claims, 2 Drawing Sheets

METALLIZED FIBERS AND METHOD THEREFOR

FIELD OF THE INVENTION

This invention pertains to metallized cellulose fibers, to composites containing same and to an electroless deposition method for making the fibers.

DESCRIPTION OF RELATED ART

Microwave engineering technology yields a steady demand for novel materials applicable to electromagnetic absorbance, reflection, manipulation and other related phenomena. Fiber-filled composites are one approach to this challenge that have witnessed significant progress in recent years. Applications range broadly over the military and civilian spheres, in communications, medicine, radar, cross-section reduction, scientific testing, and remote sensing. These materials are also relevant to emerging technology areas, such as the left-handed materials where negative dielectric constants can be observed. Typically, these composites are formed of two components, i.e., an electrically insulating matrix, usually polymeric, and a conducting particle filler of various designs. Conductive fillers, previously described, include metal powders or particles, metal wires or fibers, graphite flakes, hollow lipid-derived microcylinders, multipart dielectric-conductor-insulator fibers, and carbon fibers of higher or lower conductivity. A new class of fibers are presented herein, and a method for their preparation, based on metallized cellulose. These fibers are lightweight, tough, resilient, easily handled, and highly conductive. Preparation and characterization of such fibers is described and their effectiveness in electromagnetic composites is demonstrated.

OBJECTS AND BRIEF SUMMARY OF THE INVENTION

An object of this invention is a product composed of particulate cellulose fibers coated with a metal.

Another object of this invention is metallized cellulose fibers that can be made into an electrically non-conducting and electromagnetically absorbent composites at the onset of electrical conductivity as determined by the percolation threshold.

Another object of this invention is a method for making the metallized cellulose fibers and composites comprised of a non-electrically conducting matrix and the electrically coated conducting fibers dispersed therethrough.

Another object of this invention is a method of preparing electrically conducting fibers by an electroless deposition of an electrically conducting material on the fibers.

These and other objects of this invention can be achieved by making the metal-coated particulate cellulose by a method whereby metal coating is effected in absence of electricity.

BRIEF DESCRIPTION OF THE DRAWINGS

FIG. 5A is a plot of Frequency versus Permittivity for a 1% filled composite showing real (solid) and imaginary (dashed) permittivity. FIG. 5B is similar to FIG. 5A except the plots are for 12% composites. FIG. 5C is a plot of Loading versus Permittivity and shows real (circles) and imaginary (squares) permittivity at frequency of 5 GHz as a function of fiber loading over the coated fiber loading range of 0-12%. FIG. 5D is a plot of Frequency versus Permittivity for a polyurethane-fiber composite with 10% loading of metallized fibers, showing significant resonance over the frequency of about 10 to 14 GHz. In FIG. 5D, real and imaginary permittivities are labeled; experimental values (dashed) and curves (solid) were computed on the basis of the SDRMT theory.

DETAILED DESCRIPTION OF THE INVENTION

This invention pertains to an electrically conducting cellulose fiber product, a composite product composed of a non-conducting matrix and the conducting metallized fibers and to a method for preparing the products. The unobvious and unexpected feature herein is the suitability of metallized cellulose fibers to absorb radio frequency radiation in the microwave range of about 1-40 GHz.

Electromagnetic radiation is composed of electric and magnetic fields that are oriented at 90° to each other. Dielectric absorbers, like the metallized cellulose fibers herein and the composites containing same, interact by absorbing the electrical field components whereas magnetic absorbers interact with the magnetic field components. Dielectric materials do not interact with magnetic fields since they interact only with electrical fields.

Figure 1:
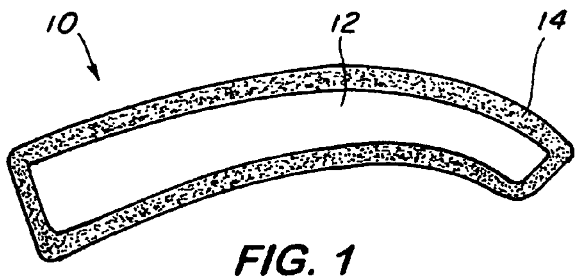
FIG. 1 is a magnified schematic illustration of a cellulose fiber coated with a metal.
Figure 2:
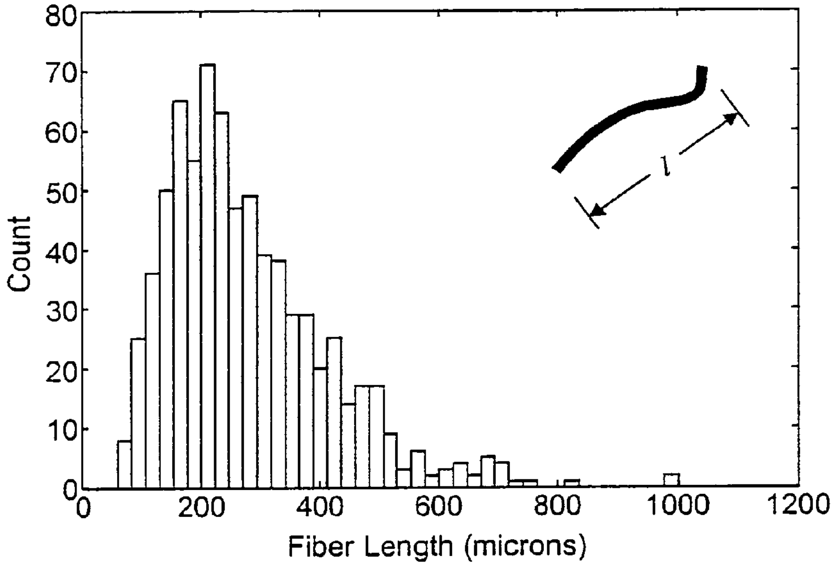
FIG. 2 is histogram of fiber length, where the fiber length is the greatest linear distance between points on an individual fiber.

FIG. 1 illustrates a coated cellulose fiber that is part of the composite product. As shown in FIG. 1, the coated solid fiber 10 is composed of cellulose fiber 12 and metal coating 14. Fiber coating thickness is typically below 5 microns and more typically below about 1 micron. Although it is desired to have a uniform thickness coated on the fibers that is a continuous coating, this is difficult to achieve in practice. In terms of amount of metal deposited on the fibers, the amount is typically in the range of 1-10 grams of metal per gram of fibers, more typically 2-5 grams of metal per gram of fibers. FIG. 2 shows that the fiber length, as defined therein, varies from less than about 50 microns to about 1000 microns, with average length being about 270 microns and average diameter thereof is about 15 microns.

Any electrically conducting or ferromagnetic metal or both can be deposited on the fibers and its thickness should be sufficient to render the fibers electrically conducting and/or magnetically effective. Thus, by plating on the fibers, an electrically conducting metal, such as copper, highly electrically conducting fibers can be formed. However, by plating on the fibers a magnetic metal, such as nickel, fibers of low electrical conductivity but of high magnetism can be obtained. By plating both an electrically conducting metal and a magnetic metal, fibers can be produced with high electrical conductivity and high magnetism. In order to deposit sufficient thickness of the metal, plating is prolonged until bubbling stops, indicating exhaustion of the plating bath.

When using solid cellulose fibers metallized with copper, there is a significant increase in mass, however, composites made pursuant to the invention disclosed herein are up to about 75% lighter than comparable prior art composites, which is due to the much lower loadings. Although comparable lightness of the metallized fibers herein is a great advantage, another advantage is in maintenance. Whereas in the past, metals, especially ferromagnetic metals such as iron powder, were not only heavy but also were subject to oxidation whereas the typical materials herein, are less subject to oxidation.

The method for making metallized fibers essentially includes four conventional steps: first, the cellulose fibers are fully hydrated to prevent excessive absorption of chemical reagents; second, a palladium catalyst/compound is used to activate the cellulose surface for metal plating or deposition, followed by extensive washing with water to remove excess palladium and reagents used in the surface activation; third, the treated fibers are dried, typically freeze-dried, to yield a fine, free-flowing fiber powder, which is now gray due to the bound palladium: and fourth, in the final method step the fibers in the powder are metallized electrolessly with a metal, typically copper, in a solution, washed and dried again.

Any suitable metal deposition on the fibers can be used, however, not all metal deposition methods work. Vapor deposition is difficult to apply although chemical precipitation appears to work well. For ease and practicality, electroless plating of the cellulose fibers was conducted using conventional commercial metallization reagents. The plating bath was prepared by adding to a vessel, with mixing, water, metallization reagents and the fibers. Sufficient amounts of the metallization reagents were added to obtain a metal coating of sufficient thickness to make the fibers electrically conducting and robust. The fibers in the plating bath before plating was commenced were white and the liquid in the bath corresponded to the color of the metallization reagents, which is blue in the case of copper metallization. Typically, 0.75-1 gram of the fibers were used per 10 liters of plating bath. During plating, the fibers went through a color change that depended on the metal plated. Duration of the electroless plating was typically 1-4 hours at room temperature. Bubbling commenced in about 5 minutes after all components were added to the bath.

Figure 3:
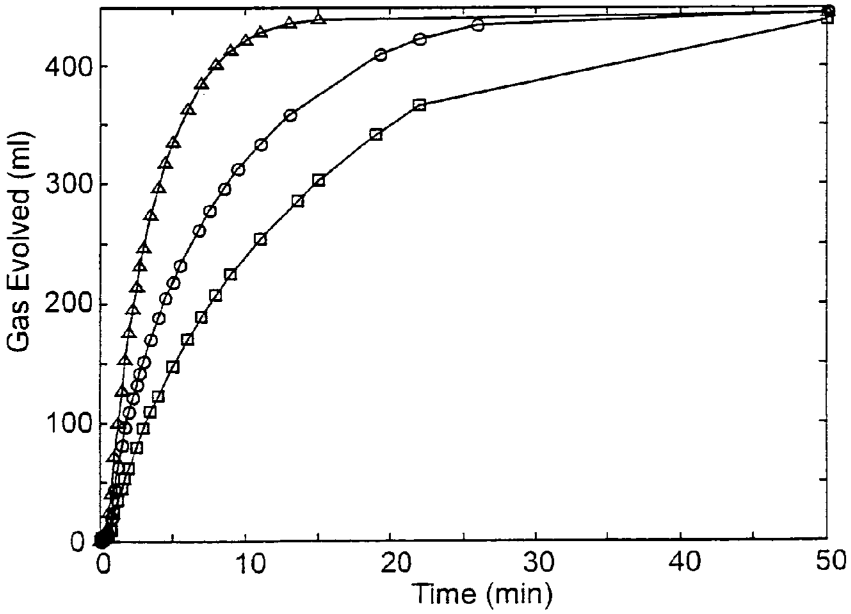
FIG. 3 is a plot of copper deposition time in a plating bath versus gas evolution.
Figure 4:
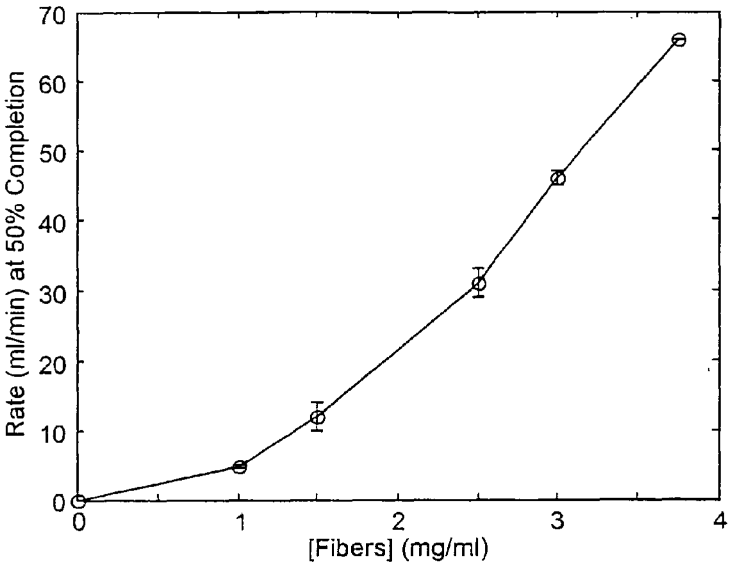
FIG. 4 is a plot of fiber concentration in mg/ml versus reaction rate at 50% completion and allows one to follow the course of the deposition reaction.

The reaction rate of the plating is a function of the concentration of the unmetallized fibers, and can be demonstrated by gas evolution. Reaction kinetics experiments show an initial short but variable lag followed by rapid progress of the plating reaction to exhaustion of plating reagents, FIG. 3 represents copper deposition onto cellulose fibers wherein plating reaction baths were composed of Fidelity 1025 electroless copper plating system, a commercial plating composition. Progress of the reaction was followed by measuring amount of evolved gas for 3 concentrations, i.e., 1.5 mg/ml (square), 2.5 mg/ml (circle), and 3.75 mg/ml (triangle). For any concentration of fibers, the reaction proceeds to the same volume of evolved gas since the reaction ceases only when the metal ions in solution have been removed by reduction. The reaction rate at 50% completion, as a function of concentration of fibers, is shown in FIG. 4, conducted under the same conditions as in the graph of FIG. 3.

There is no theoretical limit to the reaction rate, although since the fibers are a suspension, there is a practical limit to the maximum concentration. Since at completion the mass of metal deposited is constant for a given amount of plating bath, a change in the amount of fibers in the reaction results in differences in plating thickness. Analysis of the metallized fibers shows about 2.7 milliliters metal plated per milliliter of gas evolved and that this ratio is essentially constant over the range of fiber concentrations tested. This results in an approximate 3.4 increased fiber mass, as already noted, due to metal deposition when the fibers are used at a concentration of 2.5 mg/ml. In other words, a reaction of 0.5 grams in a 200 milliliter plating bath gives a yield of 1.7 grams of metallized fibers in a reaction that evolves 449 milliliters of gas. FIG. 4 shows reaction rates at 50% completion. The slope in ml/min, after evolution of about 225 ml of gas has evolved, is plotted against fiber concentration The thickness of the coating was estimated based on the volume of 1.2 grams of copper and the diameter of the original fibers, although the fibers do not have a uniform cross section. Taking the average fiber width of 39.5 microns, the thickness of a uniform copper coating is estimated to be about 3.7 microns, although a thickness falling in the range of about 1-5 microns would suffice for purposes herein.

The metallized cellulose fibers are then used to make a composite composed of the metallized fibers and a matrix material, such as a polyurethane resin or a nitrile rubber. Loading of the metallized fibers on weight basis in the composites is typically in the range of 5-50% and more typically 10-30%.

Figure 5A:
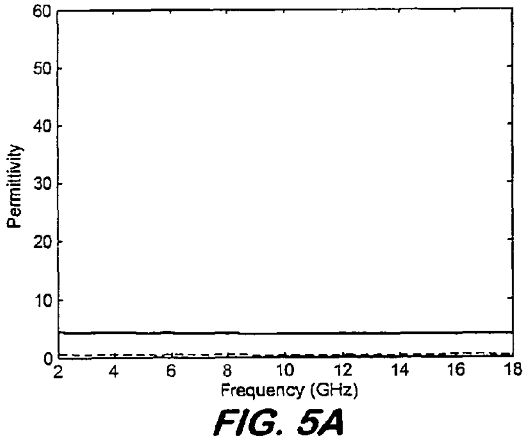
FIGS. 5A-D show microwave properties of the polyurethane matrix composites filled with the copper coated cellulose fibers of this invention at loadings varying from 0% to 12% by weight.
Figure 5B:
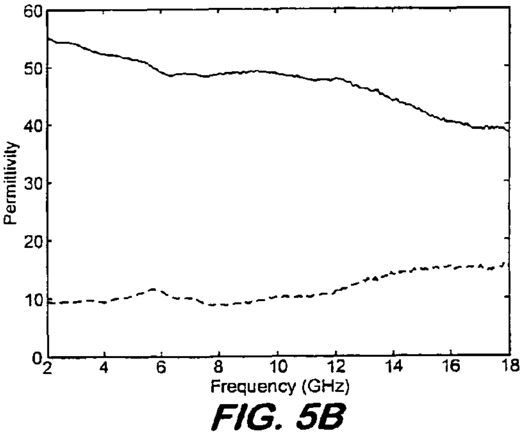

Some of the microwave properties of the composites filled with the metallized fibers are given in FIGS. 5A-D in order to demonstrate the electromagnetic applicability. FIG. 5A is a plot of Frequency v. Permittivity for a composite with a 1% loading and shows a relatively constant real permittivity of about 5 that remains essentially constant over the frequency range of 2-18 GHz. The imaginary permittivity is close to 0 and also remains essentially constant over the same frequency range. At a loading of 12%, shown in FIG. 5D, the situation is quite different, with real permittivity declining from about 5.5 to about 40 over the frequency range of 2-18 GHz with imaginary permittivity increasing from about 10 to about 15 over the same frequency range. Imaginary permittivity is proportional to conductivity and imaginary permittivity of metals is near infinite. FIG. 5B is also revealing in the sense that real and imaginary permittivities are on the intersection course at a higher frequency, the intersection denoting the percolation threshold, which is indicative of onset of electrical conductivity. So, FIG. 5B is indicative of the fact that composites with 12% loading are far removed from the percolation threshold.

At loadings that begin to approach the percolation threshold, it is typical to observe a frequency dependency of the dielectric constant, as in FIG. 5B. It should be noted that the exact frequency dispersion is not readily reproduced. The experimental error becomes quite large at the higher loadings. It is presumed that at samples near the percolation threshold have minor variations in the local fiber distribution, can lead to relatively large differences in measured properties.

Figure 5C:
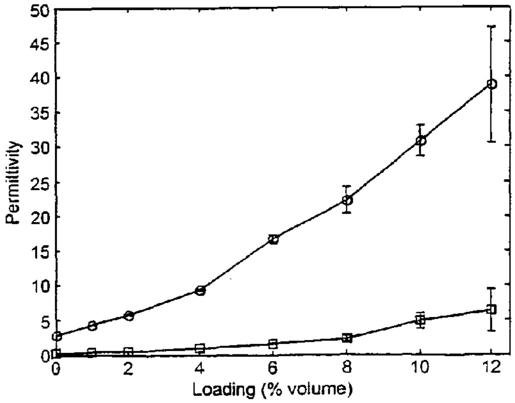

FIG. 5C shows real (circles) and imaginary (squares) permittivities at a frequency of 5 GHz as a function of metallized loading of from 0 to 12%. This shows a typical pattern where the real permittivity increases faster with loading than the imaginary permittivity. The imaginary permittivity component is proportional to the electrical conductivity of the composite and will take on high values when the loading reaches the percolation threshold where inter-fiber yields conductive paths of relatively long dimensions.

Conductivity measurements in DC are shown as in insert in FIG. 5C. Measurable conductivity was detected in samples of 4% fiber and higher. The measured values are extremely low and do not show critical behavior. From this, it is concluded that all samples are significantly below the percolation threshold.

As all samples in this series are below the percolation threshold, it is observed, as expected, that the increase in imaginary dielectric constant with loading is slight. For samples in the range of 10-12%, with imaginary permittivity of 5 and measured at 5 GHz, the conductivity is about 1.4 $(\Omega m)^{-1}$. The highest conductivity observed at 12% fiber land measured at 18 GHz loading is about 15 $(\Omega m)^{-1}$. The conductivity of the fibers themselves is on the order of $10^6$ $(\Omega m)^{-1}$.

A further phenomenon that may be observed with fiber-filled composites at microwave frequencies is resonance based on the fiber length, as is discussed below. This results in dramatic changes in dielectric properties in the neighborhood of the resonance, and can yield negative values under some conditions. The permittivity as a function of frequency can be described in terms of the scale dependant effective medium theory (SDEMT) where the permittivity versus frequency of resonating composite is given by the Lorenzian law. FIG. 5C shows that even at a loading of 12%, the real and imaginary permittivities are far removed from each other, indicating that composites of 0-12% loadings are far removed from the percolation threshold. The insert graph in FIG. 5C confirms this by showing that a composite with a 12% loading has electrical conductivity of about $35\times10^{-10}$ $(\Omega m)^{-1}$, which is electrically non-conductive.

Figure 5D:
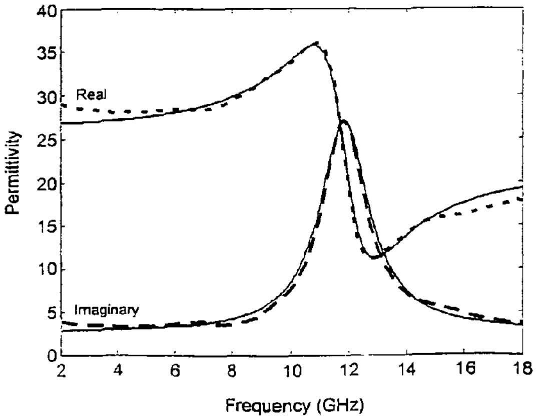

FIG. 5D shows a graph of Permittivity v. Frequency for a composite sample at 10% loading. In FIG. 5D, real and imaginary permittivities are labeled and dashed experimental values (solid) were determined by SDEMT theory. Resonance frequency in FIG. 5D is over the range of about 10-14 GHz whereat wavelength of energy in the material is of the same length as the length of the fibers so that energy is resonating on the fibers at that particular frequency at which there is an increase in absorbance at that point or a great increase in imaginary permittivity. As shown FIG. 5D, resonance peak is at about 12 GHz although in most composites, what is desired is absorption across the frequency range. Although FIG. 5D shows two points of intersection, these intersecting points do not indicate electrical conductivity which would be accompanied by an infinite imaginary permittivity.

Having described the invention, the following example is given as a particular embodiment thereof and to demonstrate the practice thereof. It is understood that the example is not intended to limit the specification of the appended claims in any manner.

EXAMPLE

This example demonstrates preparation of metallized cellulose fibers and composites made using the metallized fibers, with the matrix material a polyurethane resin. Moldings were made between two flat plates, with shims to determine thickness. Composite samples were cured for 24 hours at room temperature. Electromagnetic measurements were conducted with a Hewlett-Pakhard 8510 Network Analyzer and permittivities were calculated by the Nicholson Ross technique. The samples were 1.27 mm thick and toroidal with inner diameter of 3 mm and outer diameter of 7 mm and measured in a coaxial cable arrangement. DC conductivity of the composites was measured across the 1.27 mm thickness between metal plates of 5 cm by 1.8 cm. Measurements were made with a Kiethly 194 A Digital Multimeter. The limit of detection was about $3\times10^{-10}$ $(\Omega m)^{-1}$.

Pursuant to the method, the fibers were produced from fibrous cellulose. Twenty grams of dry cellulose fibers, with a density of about 1.5 g/cc, was mixed with a small quantity of about 20 ml of water and then added to a 1 liter solution of 160 grams Cataprep 404 and 10 ml of Shipley Cataposit 44 palladium activation catalyst in water. After 10 minutes, the fibers were removed by filtration and suspended in a wash solution of Cataprep 404. Filtration was repeated and followed with 4 water washes of 1 liter each. The final filter cake of about 20 grams was freeze-dried to yield a fine, free-flowing light gray powder.

The electroless copper plating bath was Fidelity 1025. Dry fibers were added at the concentrations specified in the text and subjected to continuous stirring. The plating bath at beginning was of a deep blue color. Once exhausted, the plating bath became clear and the reaction mixture was filtered, and the fibers washed with water and freeze-dried.

Absolute density was determined by water displacement. A known mass of fibers was place in a pre-weighed graduated cylinder. The volume of water was determined by re-weighing the cylinder. The volume occupied by the fibers was determined by subtracting the volume of water from the total volume.

An approximation of the conductivity of the metal plated onto cellulose was determined by the use of a Spectra/Por cellulose membrane (Spectrum) as a surrogate material. Measurement of the conductivity of individual fibers is impractical and the conductivity of bulk fiber is dominated by contact resistance. A membrane of 10 mm width and 8.5 cm long was plated with electroless copper essentially as described above. The final thickness was 30.5 microns, with a copper layer on both sides of less than 100 mm, as determined by weight gain. The resistance of this membrane was 3.5Ω which corresponds to conductivity of $8.1\times10^5$ $(\Omega m)^{-1}$.

Sample composites were fabricated by adding the requisite mass of fibers to polyurethane LS-40 resin, obtained from B&B Enterprises, to yield the desired volume percentage. Moldings were made between two flat plates, with shims to determine the thickness. Samples were cured for 24 hours at room temperature. Electromagnetic measurements were conducted with a Hewlett-Packard 8510 Analyzer and permittivities were calculated by the Nicholso-Ross technique. Samples 1.27 mm thick were measured in a coaxial cable arrangement.

While presently preferred embodiments have been shown of the novel metallized fibers in a matrix and a method for making same, and of the several modifications discussed, persons skilled in this art will readily appreciate that various additional changes and modifications may be made without departing from the spirit of the invention as defined and differentiated by the following claims.

What is claimed is:

1. A lightweight electrically non-conductive composite product capable of absorbing electromagnetic radiation comprising:

an electrically non-conducting matrix material and an electrically conducting metallized cellulose fibers loaded into the non-conducting matrix material, wherein the metallized cellulose fibers are loaded at about 1-12% by volume of the metallized cellulose fibers on the basis of combined weight of the metallized cellulose fibers and said matrix material, forming a composite product having a DC electrical conductivity of less than or equal to about $35\times10^{-10}$ $(\Omega m)^{-1}$; and wherein the average length of the cellulose fibers, defined as the greatest distance between points on an individual fiber, is about 300 microns or less.

2. The product of claim 1, wherein the cellulose fibers having a metal coating thereon.

3. The product of claim 2, wherein metal deposition is 1-10 g/g of said fibers.

4. The product of claim 2, wherein metal deposition is 2-5 g/g of said fibers.

5. The product of claim 2, wherein the metal coating is copper.

6. The product of claim 2, wherein the metal is selected from the group consisting of copper, nickel, iron and mixtures thereof.

7. The product of claim 2, wherein the metal is selected from the group consisting of copper, nickel, iron, silver, gold and mixtures thereof.

8. The product of claim 1, that is up to 75% by weight lighter than a comparable prior art product composed of up to about 80% by weight iron plus up to about 20% by weight electrically non-conducting matrix material.

* * * * *